United States Patent
Liu

(10) Patent No.: US 12,267,914 B2
(45) Date of Patent: Apr. 1, 2025

(54) METHOD FOR DETERMINING CAPABILITY OF UE, DEVICE AND STORAGE MEDIUM

(71) Applicant: GUANGDONG OPPO MOBILE TELECOMMUNICATIONS CORP., LTD., Guangdong (CN)

(72) Inventor: Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 350 days.

(21) Appl. No.: 17/644,725

(22) Filed: Dec. 16, 2021

(65) Prior Publication Data

US 2022/0109979 A1 Apr. 7, 2022

Related U.S. Application Data

(63) Continuation of application No. PCT/CN2019/091790, filed on Jun. 18, 2019.

(51) Int. Cl.
*H04W 8/24* (2009.01)
*H04W 60/00* (2009.01)
*H04W 84/04* (2009.01)

(52) U.S. Cl.
CPC .......... *H04W 8/24* (2013.01); *H04W 60/00* (2013.01); *H04W 84/042* (2013.01)

(58) Field of Classification Search
CPC ..... H04W 60/00; H04W 8/24; H04W 84/042; H04W 48/16
See application file for complete search history.

(56) References Cited

U.S. PATENT DOCUMENTS

| | | | |
|---|---|---|---|
| 2011/0208959 A1 | 8/2011 | Kant | |
| 2014/0372557 A1* | 12/2014 | Buckley | H04L 67/104 709/217 |
| 2015/0208456 A1 | 7/2015 | Guo et al. | |
| 2015/0334769 A1* | 11/2015 | Kim | H04W 76/27 370/329 |
| 2017/0105170 A1 | 4/2017 | Gao et al. | |
| 2018/0302785 A1 | 10/2018 | Larmo et al. | |
| 2019/0239064 A1* | 8/2019 | Stojanovski | H04W 76/27 |
| 2019/0313239 A1* | 10/2019 | Horn | H04W 8/08 |
| 2019/0363843 A1* | 11/2019 | Gordaychik | H04W 72/044 |

(Continued)

FOREIGN PATENT DOCUMENTS

| CN | 102761857 A | 10/2012 |
|---|---|---|
| CN | 103517259 A | 1/2014 |

(Continued)

OTHER PUBLICATIONS

Ericsson et al. "Capability ID based on early filter information" 3GPP TSG-RAN WG2 #106 R2-1907339; Reno, Nevada, USA, May 13-17, 2019, 6 pages.

(Continued)

*Primary Examiner* — Congvan Tran
(74) *Attorney, Agent, or Firm* — PERKINS COIE LLP

(57) ABSTRACT

A method for determining a capability of a UE, a device and a storage medium are provided. The method includes that: the UE transmits a network mode to a core network element, wherein the network mode is used by the core network element to determine a UE capability identifier corresponding to the network mode.

17 Claims, 7 Drawing Sheets

(56) References Cited

U.S. PATENT DOCUMENTS

| | | | |
|---|---|---|---|
| 2021/0243590 A1 | 8/2021 | Jin et al. | |
| 2021/0360729 A1* | 11/2021 | Yiu | H04W 76/27 |
| 2022/0103599 A1* | 3/2022 | Zheng | G06F 9/45558 |
| 2022/0174557 A1* | 6/2022 | He | H04W 8/22 |
| 2022/0248314 A1* | 8/2022 | Won | H04W 8/04 |

FOREIGN PATENT DOCUMENTS

| | | |
|---|---|---|
| CN | 104955127 A | 9/2015 |
| CN | 106211311 A | 12/2016 |
| CN | 107182109 A | 9/2017 |
| CN | 107342979 A | 11/2017 |
| CN | 109587701 A | 4/2019 |
| EP | 2648459 A1 | 10/2013 |
| EP | 3926989 A1 | 12/2021 |
| WO | 2010128383 A1 | 11/2010 |
| WO | 2016201913 A1 | 12/2016 |
| WO | 2018144081 A1 | 8/2018 |

OTHER PUBLICATIONS

Nokia et al. "Introduction of Radio Capabilities Signalling Optimisation feature" GPP TSG-SA WG2 Meeting #133 S2-1904979; Reno, Nevada, May 13-17, 2019, 19 pages.

Qualcomm Incorporated et al. "Adds UE Radio Capability ID in signalling procedures" 3GPP TSG-SA WG2 Meeting #133 S2-1906385(was S2-1903203); Reno, NV, USA, May 13-17, 2019. 66 pages.

Supplementary European Search Report in the European application No. 19933389.9, mailed on May 11, 2022. 14 pages.

Written Opinion of the International Search Authority in the international application No. PCT/CN2019/091790, mailed on Mar. 18, 2020. 8 pages with English Translation.

First Office Action of the Chinese application No. 201980049082.X, issued on Oct. 31, 2022. 13 pages with English translation.

International Search Report in the international application No. PCT/CN2019/091790, mailed on Mar. 18, 2020.

Vivo, "Solution for how to define the UE capability ID", SA WG2 Meeting #128-bis S2-187933, Aug. 20-24, 2018, chapter 1-2, 2 pages.

TSG CN WG5 (OSA), "LS "Terminal capabilities change notification in OSA"", TSG-SA WG1 (Services) meeting #12 TSG S1-010296, May 7-11, 2001, the whole document, 11 pages.

Samsung, "Use of identifier representing NR UE capabilities, baseline", 3GPP TSG-RAN WG2#99 bis R2-1711504, Oct. 9-13, 2017, the whole document, 5 pages.

RAN2,Qualcomm, "Response LS on Handling of UE E-UTRAN capabilities when UE is camping on NB-IOT", 3GPP TSG RAN WG3 Meeting ##NR Ad-hoc R3-170018, Jan. 17-19, 2017, the whole document, 2 pages.

Samsung, "Use of identifier representing NR UE capabilities, baseline", 3GPP TSG-RAN WG2 meeting #101 bis R2-1805613, Apr. 6-20, 2018, the whole document, 5 pages.

Zte, "Removal ISR capability from the UE network capability", 3GPP TSG-SA2#68, S2-087104, Oct. 13-17, 2008, the whole document, 12 pages.

Second Office Action of the Chinese application No. 201980049082. X, issued on Jun. 9, 2023, 17 pages with English translation.

* cited by examiner

METHOD FOR DETERMINING CAPABILITY OF UE, DEVICE AND STORAGE MEDIUM

CROSS REFERENCE TO RELATED APPLICATIONS

This application is a continuation of PCT International Application No. PCT/CN2019/091790 filed on Jun. 18, 2019, which is hereby incorporated by reference in its entirety.

BACKGROUND

In the related art, a User Equipment (UE) (i.e., terminal device) may support at least two kinds of network modes simultaneously, and such a UE is referred to as a multimode UE. The UE in different network modes may use different UE capabilities. However, at present, there is no effective solution for determining a capability of the multimode UE.

SUMMARY

The embodiments of the present disclosure relate to the field of wireless communication technologies, and provide a method for determining a capability of a UE, a device, and a storage medium.

According to a first aspect, an embodiment of the present disclosure provides a method for determining a capability of a UE. The method includes the following operations.

A core network element determines, according to a network mode in which the UE camps, a UE capability identifier corresponding to the network mode. The core network element transmits the UE capability identifier to an access network element.

According to a second aspect, an embodiment of the present disclosure provides a method for determining a capability of a UE. The method includes the following operations.

The UE transmits a network mode to a core network element. The network mode is used by the core network element to determine a UE capability identifier corresponding to the network mode.

According to a third aspect, an embodiment of the present disclosure provides a core network element. The core network element includes a processor, a network interface, and a memory for storing computer program instructions that, when executed by the processor, cause the processor to determine, according to a network mode in which a User Equipment (UE) camps, a UE capability identifier corresponding to the network mode; and control the network interface to transmit the UE capability identifier to an access network element.

According to a fourth aspect, an embodiment of the present disclosure provides a UE. The UE includes a processor, a network interface, and a memory for storing computer program instructions that, when executed by the processor, cause the processor to control the network interface to transmit a network mode to a core network element. The network mode is used by the core network element to determine a UE capability identifier corresponding to the network mode.

DETAILED DESCRIPTION

In order to enable more detailed understanding of the features and technical content of the embodiments of the present disclosure, the implementation of the embodiments of the present disclosure will be described in detail below with reference to the accompanying drawings, which are for illustration purposes only and are not intended to limit the embodiments of the present disclosure.

Before the detailed description of a method for determining a capability of a UE provided in the embodiments of the present disclosure, the reporting of the UE capability in the related art is briefly described.

In the related art, when a UE performs registration or registration update, the UE reports a capability of the UE to an access network element, and the access network element transmits the capability of the UE to the core network element for storage. When the UE initiates a connection setup request, the access network element requests the core network element for capability information of the UE, and provides a corresponding configuration for the UE according to the capability information of the UE.

However, as the UE supports more and more characteristics, capabilities of the UE increases accordingly. The capability information of the UE will also become larger and larger. Transferring of the capability of the UE between the UE, the access network element, and the core network element will result in significant signaling overhead. In addition, when the core network element stores the capability of the UE, the burden of the core network element is increased.

In order to reduce the signaling overhead and the burden of the core network element, an embodiment of the present disclosure provides a method for reporting a capability of a UE. A capability set of the UE corresponds to a capability identifier of the UE. When the UE reports the capability of the UE to the access network element, only the capability identifier of the UE corresponding to the capability of the UE needs to be reported. Moreover, the core network element only needs to store the capability identifier of the UE.

Figure 1:
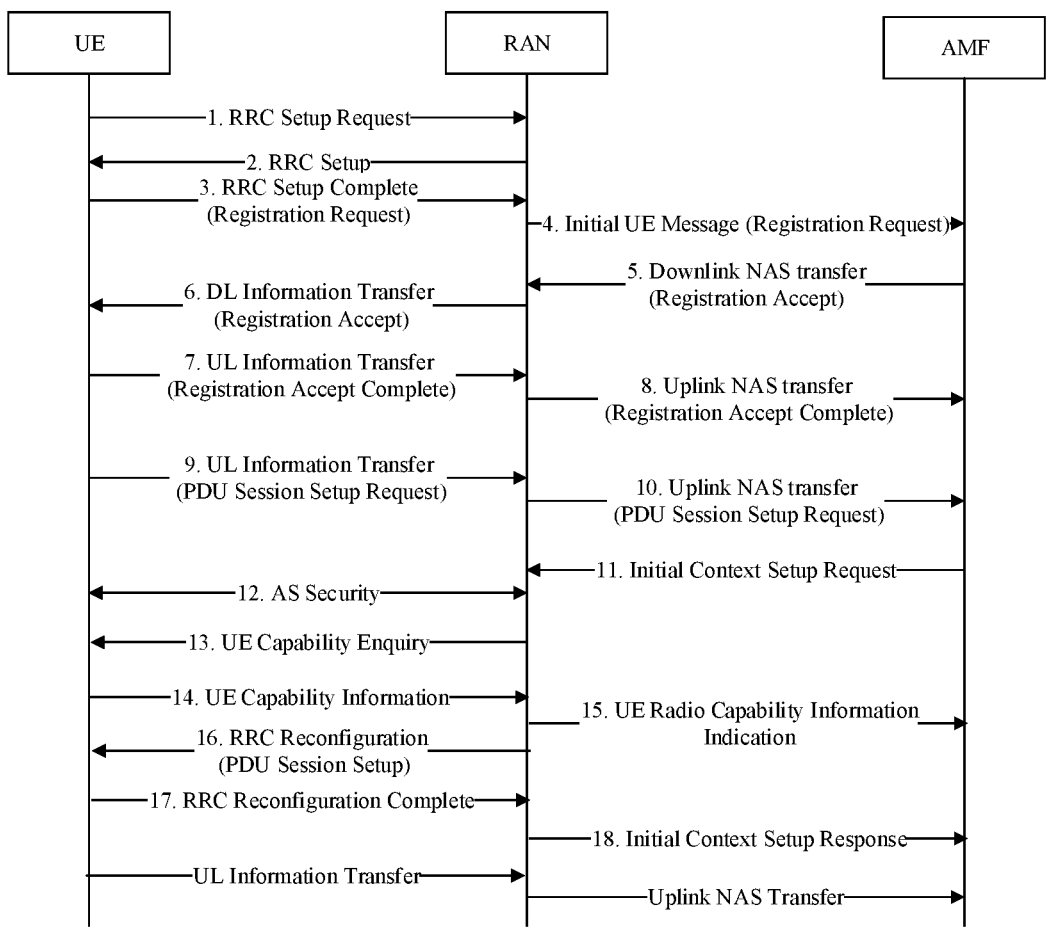
FIG. 1 is a diagram of a processing procedure during a UE reporting capability information according to a request of a network device in the present disclosure.

However, when a network device (e.g., the core network element) does not store the capability identifier of the UE, a processing procedure of reporting the capability information by the UE according to a request of the network device is illustrated in FIG. 1. The network device (e.g., the core network element) requests the UE to report a part of the capability of the UE according to a requirement of a local configuration.

Based on the above problems, the present disclosure provides a method for determining a capability of a UE. The method for reporting the capability of the UE according to the embodiments of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, a Frequency Division Duplex (FDD) system, a Time Division Duplex (TDD) system, a Universal Mobile Telecommunications System (UMTS), a Worldwide Interoperability for Microwave Access (WiMAX) communication system and/or a 5G system.

Figure 2:
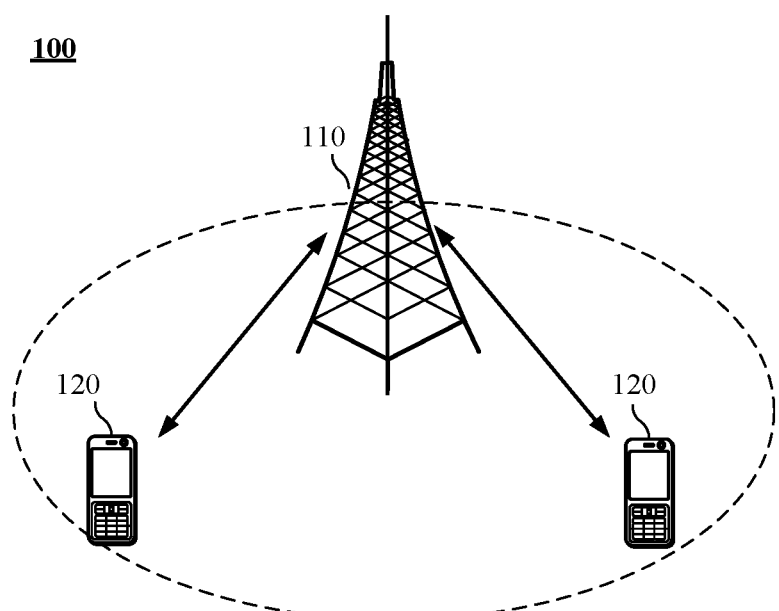
FIG. 2 is a structural diagram of a communication system according to an embodiment of the present disclosure.

Exemplarily, a communication system 100 to which the embodiments of the present disclosure are applied is illustrated in FIG. 2. The communication system 100 may include a network device 110, which may be a device that communicates with a terminal device 120 (or referred to as a communication terminal, a terminal). The network device 110 may provide communication coverage for a particular geographic area and may communicate with a terminal device located within the coverage area. Alternatively, the network device 110 may be a base transceiver station (BTS) in a GSM system or a CDMA system, or may be a NodeB (NB) in a WCDMA system, or may be an Evolutional Node B (or eNode B) in an LTE system, or may be a radio controller in a cloud radio access network (CRAN). Alternatively, the network device 110 may be a mobile switching center, a relay station, an access point, a vehicle-mounted device, a wearable device, a hub, a switch, a bridge, a router, a network device in a 5G network, a network device in a future evolved public land mobile network (PLMN), or the like.

The communication system 100 further includes at least one terminal 120 located within the coverage of the network device 110. "Terminal device" used herein includes, but is not limited to, a device that is configured to receive/transmit communication signals via a wired connection (such as via a Public Switched Telephone Networks (PSTN), Digital Subscriber Line (DSL), digital cable, direct cable connection, and/or another data connection/network), and/or a wireless interface with, for example, a cellular network, a Wireless Local Area Network (WLAN), a Digital TV network such as Digital Video Broadcasting Handheld (DVB-H) network, a satellite network, an Amplitude Modulation (AM)-Frequency Modulation (FM) broadcast transmitter and/or another communication terminal; and/or an Internet of Things (IoT) device. A terminal device configured to communicate over a wireless interface may be called "a wireless communication terminal", "a wireless terminal" or "a mobile terminal". Examples of the mobile terminal may include, but are not limited to, a satellite or cellular phone; a personal communications system (PCS) terminal that can combine a cellular radio telephone with data processing, facsimile, and data communication capabilities; a Personal Digital Assistant (PDA) that can include a radiotelephone, a pager, an Internet/intranet access, a Web browser, a notebook, calendar and/or a Global Positioning System (GPS) receiver; and a conventional laptop and/or palmtop receiver, or other electronic devices including radiotelephone transceivers. The terminal device may be an access terminal, User Equipment (UE), a user unit, a user station, a mobile station, a mobile platform, a remote station, a remote terminal, a mobile device, a user terminal, a terminal, a wireless communication device and a user proxy or user device. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, a vehicle-amounted device, a wearable device, a terminal device in a 5G network, or a terminal device in a future evolved Public Land Mobile Network (PLMN), or the like.

Alternatively, a Device to Device (D2D) communication may be performed between the terminals 120.

Alternatively, a 5G system or a 5G network may also be referred to as a New Radio (NR) system or an NR network.

FIG. 2 schematically illustrates one network device and two terminal devices. Alternatively, the communication system 100 may include multiple network devices and other quantities of terminal devices that may be included within the coverage area of each network device, which is not limited in the embodiment of the present disclosure.

Alternatively, the communication system 100 may further include other network entities such as a network controller and/or a mobility management entity, which are not limited in the embodiment of the present disclosure.

It should be understood that in the embodiments of the present disclosure, a device having a communication function in a network/system may be referred to as a communication device. Taking the communication system 100 illustrated in FIG. 2 as an example, the communication device may include a network device 110 and a terminal device 120 that have a communication function. The network device 110 and the terminal device 120 may be specific devices described above, and details are not described herein. The communication device may further include other devices in the communication system 100, such as a network controller, a mobility management entity, and other network entities, which are not limited in the embodiment of the present disclosure.

Figure 3:
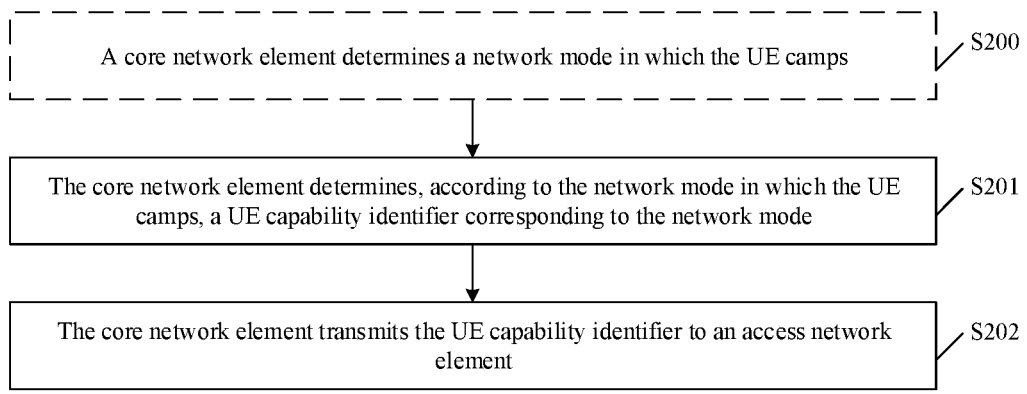
FIG. 3 is a flowchart of a method for determining a capability of a UE according to an embodiment of the present disclosure.

An embodiment of the present disclosure provides a method for determining a capability of a UE, which is performed by a core network element. As illustrated in FIG. 3, the method includes the following operations.

At operation S201, the core network element determines, according to a network mode in which the UE camps, a UE capability identifier corresponding to the network mode.

In the embodiment of the present disclosure, the network mode has a correspondence with the UE capability identifier. According to the network mode, the UE capability identifier corresponding to the network mode can be determined.

Thus, before performing the operation S201, the method further includes the following operation.

At operation S200, the core network element determines the network mode in which the UE camps.

In a specific implementation, the core network element determines the network mode in which the UE camps according to an identity of a cell on which the UE camps, or according to a registration area of the UE, a location area of the UE or a tracking area of the UE. Alternatively, when the UE reports the capability of the UE or the UE capability identifier to the core network element, the UE further indicates the network mode suitable for the capability of the UE or the UE capability identifier. Herein, in a case that the UE camps on a cell, or moves to a new registration area/tracking area, when the UE initiates a registration request or a registration update, or an attach request or a tracking area update, the UE transmits a UE capability identifier to the core network element, and the UE capability identifier is a capability identifier matching a network mode of the current cell or the registration area/tracking area.

In the embodiment of the present disclosure, for each network mode among different network modes, a respective UE capability identifier has a correspondence with a corresponding capability set of the UE. For example, in a network mode, a capability identifier has a first correspondence with a capability set of the UE. In another network mode, another UE capability identifier has a second correspondence with another capability set of the UE.

For a capability identifier allocated by a manufacturer of the UE, the core network element can obtain, from a UE Capability Management Function (UCMF) entity, a capability database for the manufacturer to which the UE belongs. The database includes mapping relationships between capability sets of the UE and UE capability identifiers corresponding to the capability sets of the UE. For each network mode among different network modes, a respective capability identifier has an independent mapping relationship with a corresponding capability set of the UE. When the core network element receives a UE capability identifier indicated by the UE, the core network element can determine a network mode to which the UE capability identifier belongs, and save a correspondence between the determined network mode and the UE capability identifier. Herein, the capability sets of the UE included in the capability database for the manufacturer to which the UE belongs are also referred to as first capability information.

For a capability identifier allocated by a Public Land Mobile Network (PLMN), the core network element can obtain, from the UCMF entity, a capability database for the PLMN. The database includes mapping relationships between capability sets of the UE and UE capability identifiers corresponding to the capability sets of the UE. For each network mode among different network modes, a respective UE capability identifier has an independent mapping relationship with a corresponding capability set of the UE. When the core network element receives a UE capability identifier indicated by the UE, the core network element can determine a network mode to which the UE capability identifier belongs, and save a correspondence between the determined network mode and the UE capability identifier. Herein, the capability sets of the UE included in the capability database for the PLMN are also referred to as second capability information.

In some embodiments, if there is no corresponding identifier for a capability set of the UE, the core network element will obtain the capability set of the UE and provide the capability set of the UE to the UCMF entity. Alternatively, the core network element further indicates, to the UCMF entity, a network mode to which the capability set of the UE belongs. The UCMF entity allocates a corresponding UE capability identifier to the capability set of the UE, and feeds back the UE capability identifier to the core network element. The core network element configures the allocated UE capability identifier to the UE, and the UE records a correspondence among the UE capability identifier, the capability set of the UE, and the network mode.

Herein, the correspondence among the capability set of the UE, the UE capability identifier, and the network mode of the UE includes that the capability set of the UE, the UE capability identifier, and the network mode of the UE are in a one-to-one correspondence.

That is, a UE capability identifier corresponds to a capability set of the UE, and the capability set of the UE is suitable for a particular network mode. In this manner, in the UE capability identifiers allocated by the manufacturer of the UE, the manufacturer of the UE allocates different UE capability identifiers for capability sets of the UE corresponding to different network modes. In the UE capability identifiers allocated by the PLMN, the PLMN allocates different UE capability identifiers for capability sets of the UE corresponding to different network modes.

At operation S202, the core network element transmits the UE capability identifier to an access network element.

It should be noted that the method for determining the capability of the UE provided in the embodiment of the present disclosure is applicable to at least an NR system and an Evolved Packet System (EPS). The core network element described in the embodiment of the present disclosure includes an Access and Mobility Management Function (AMF) entity or a Mobility Management Entity (MME). The network mode described in the embodiment of the present disclosure includes at least one of: a Narrow Band Internet of Things (NB-IoT) mode, a Wide Band-Evolved Universal Mobile Telecommunication System (UMTS) Terrestrial Radio Access Network (WB-EUTRAN) mode, or a Radio Access Technology (RAT) network mode other than NB-IoT and WB-EUTRAN.

According to the method for determining a capability of a UE provided by the embodiments of the present disclosure, the core network element determines, according to the network mode in which the UE camps, the UE capability identifier corresponding to the network mode; and the core network element transmits the UE capability identifier to the access network element. In this way, the core network element determines the UE capability identifier corresponding to the network mode according to the network mode in which the UE camps, so that the UE capability identifier obtained by the core network element is a valid UE capability identifier, thereby improving the efficiency of obtaining the UE capability identifier by the core network element.

Figure 4:
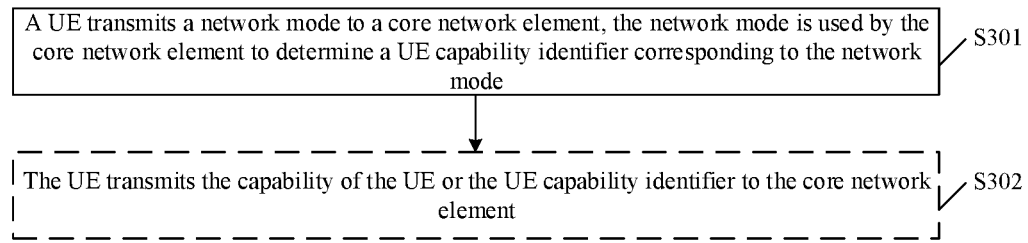
FIG. 4 is another flowchart of a method for determining a capability of a UE according to an embodiment of the present disclosure.

An embodiment of the present disclosure provides another method for determining a capability of a UE. As illustrated in FIG. 4, the method includes the following operations.

At operation S301, the UE transmits a network mode to a core network element. The network mode is used by the core network element to determine a UE capability identifier corresponding to the network mode.

In an embodiment of the present disclosure, for each network mode among different network modes, a respective capability identifier has a correspondence with a corresponding capability set of the UE. For example, in a network mode, a UE capability identifier has a first correspondence with a capability set of the UE. In another network mode, another UE capability identifier has a second correspondence with another capability set of the UE.

For a capability identifier allocated by a manufacturer of the UE, the core network element can obtain, from a UE Capability Management Function (UCMF) entity, a capability database for the manufacturer to which the UE belongs. The database includes mapping relationships between capability sets of the UE and UE capability identifiers corresponding to the capability sets of the UE. For each network mode among different network modes, a respective capability identifier has an independent mapping relationship with a corresponding capability set of the UE. When the core network element receives a UE capability identifier indicated by the UE, the core network element can determine a network mode to which the UE capability identifier belongs, and save a correspondence between the determined network mode and the UE capability identifier. Herein, the capability sets of the UE included in the capability database for the manufacturer to which the UE belongs are also referred to as first capability information.

For a capability identifier allocated by a Public Land Mobile Network (PLMN), the core network element can obtain, from the UCMF entity, a capability database for the PLMN. The database includes mapping relationships between capability sets of the UE and UE capability identifiers corresponding to the capability sets of the UE. For each network mode among different network modes, a respective UE capability identifier has an independent mapping relationship with a corresponding capability set of the UE. When the core network element receives a UE capability identifier indicated by the UE, the core network element can determine a network mode to which the UE capability identifier belongs, and save a correspondence between the determined network mode and the UE capability identifier. Herein, the capability sets of the UE included in the capability database for the PLMN are also referred to as second capability information.

In an embodiment of the present disclosure, the method for determining the capability of the UE further includes the following operation.

At operation S302, the UE transmits the capability of the UE or the UE capability identifier to the core network element.

In a specific implementation, the order of executions of the operation S301 and the operation S302 is not limited. The operation 301 may be performed before the operation 302. Or, the operation 302 may be performed before the operation 301. Or, the operation S301 and the operation S302 may be performed simultaneously.

In some embodiments, if there is no corresponding identifier for a capability set of the UE, after performing the operation S301, the method further includes the following operation.

At operation S303, the UE receives the UE capability identifier transmitted by the core network element. The UE capability identifier is allocated by the UCMF entity.

Herein, the capability set of the UE has a correspondence with the UE capability identifier and the network mode of the UE. Alternatively, the capability set of the UE, the UE capability identifier, and the network mode of the UE are in a one-to-one correspondence. That is, a UE capability identifier corresponds to a capability set of the UE, and the capability set of the UE is suitable for a particular network mode. In this manner, in the UE capability identifiers allocated by the manufacturer of the UE, the manufacturer of the UE allocates different UE capability identifiers for capability sets of the UE corresponding to different network modes. In the UE capability identifiers allocated by the PLMN, the PLMN allocates different UE capability identifiers for capability sets of the UE corresponding to different network modes.

It should be noted that the method for determining the capability of the UE provided in the embodiment of the present disclosure is applicable to at least an NR system and an EPS system. The core network element described in the embodiment of the present disclosure includes an Access and Mobility Management Function (AMF) entity or a Mobility Management Entity (MME). The network mode described in the embodiment of the present disclosure includes at least one of: a Narrow Band Internet of Things (NB-IoT) mode, a Wide Band-Evolved Universal Mobile Telecommunication System (UMTS) Terrestrial Radio Access Network (WB-EUTRAN) mode, or a Radio Access Technology (RAT) network mode other than NB-IoT and WB-EUTRAN.

Figure 5:
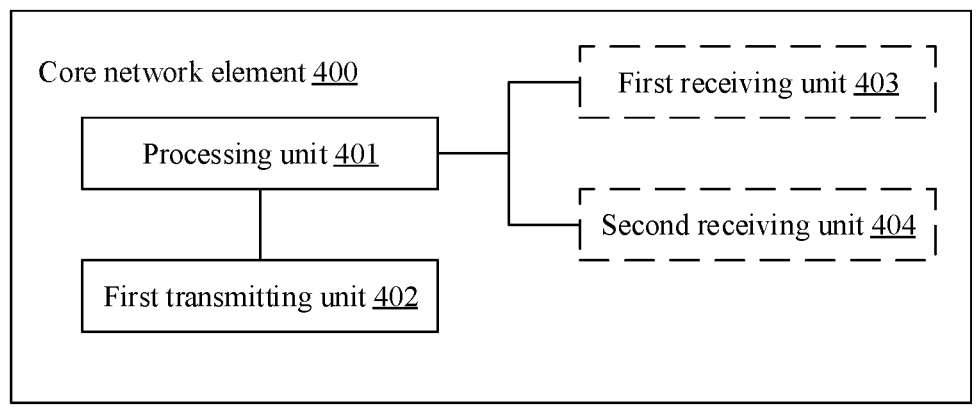
FIG. 5 is a structural diagram of a core network element according to an embodiment of the present disclosure.

In order to implement the method for determining the capability of the UE, an embodiment of the present disclosure further provides a core network element. As illustrated in FIG. 5, the core network element 400 includes a processing unit 401 and a first transmitting unit 402.

The processing unit 401 is configured to determine, according to a network mode in which a UE camps, a UE capability identifier corresponding to the network mode.

The first transmitting unit 402 is configured to transmit the UE capability identifier to an access network element.

In an embodiment, the processing unit 401 is further configured to determine the network mode in which the UE camps according to at least one of: an identity of a cell on which the UE camps, a registration area of the UE, a location area of the UE, a tracking area of the UE, or the network mode that is indicated by the UE when the UE reports a capability or the capability identifier and that is suitable for the capability or the capability identifier.

In an embodiment, for each network mode among different network modes, a respective UE capability identifier has a correspondence with a corresponding capability set of the UE.

For a UE capability identifier allocated by a manufacturer of the UE, the correspondence is determined by the UE based on first capability information obtained from the UCMF entity. The first capability information is capability information for the manufacturer of the UE.

For a UE capability identifier allocated by a Public Land Mobile Network (PLMN), the correspondence is determined by the UE based on second capability information obtained from the UCMF entity. The second capability information is capability information for the PLMN.

In an embodiment, the core network element further includes a first receiving unit 403.

The first transmitting unit 402 is further configured to transmit an obtained capability set of the UE to a UE Capability Management Function (UCMF) entity.

The first receiving unit 403 is configured to receive the UE capability identifier allocated by the UCMF entity for the capability set of the UE.

In an embodiment, the first transmitting unit 402 is further configured to transmit, to the UCMF entity, the network mode to which the capability set of the UE belongs.

In an embodiment, the first transmitting unit 402 is further configured to transmit, to the UE, the UE capability identifier for the UE to store a correspondence among the capability set of the UE, the UE capability identifier, and the network mode of the UE.

Herein, the correspondence among the capability set of the UE, the UE capability identifier, and the network mode of the UE includes that: the capability set of the UE, the UE capability identifier, and the network mode of the UE are in a one-to-one correspondence.

In an embodiment, for different network modes, different capability sets of the UE correspond to different UE capability identifiers.

In an embodiment, the core network element 400 further includes a second receiving unit 404, configured to receive the UE capability identifier transmitted by the UE. The UE capability identifier matches the network mode of a current cell, a registration area, or a tracking area.

In an embodiment, the network mode includes at least one of: a Narrow Band Internet of Things (NB-IoT) mode, a Wide Band-Evolved Universal Mobile Telecommunication System (UMTS) Terrestrial Radio Access Network (WB-EUTRAN) mode, or a Radio Access Technology (RAT) network mode other than NB-IoT and WB-EUTRAN. The core network element includes an Access and Mobility Management Function (AMF) entity or a Mobility Management Entity (MME).

Figure 6:
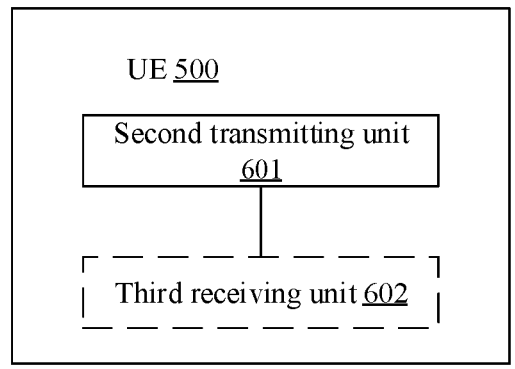
FIG. 6 is a structural diagram of a UE according to an embodiment of the present disclosure.

In order to implement the method for determining the capability of the UE, an embodiment of the present disclosure further provides a UE. As illustrated in FIG. 6, the composition structure of the UE 500 includes a second transmitting unit 601.

The second transmitting unit 601 is configured to transmit a network mode to a core network element. The network mode is used by the core network element to determine a UE capability identifier corresponding to the network mode.

In an embodiment, for each network mode among different network modes, a respective UE capability identifier has a correspondence with a corresponding capability set of the UE.

In an embodiment, for a UE capability identifier allocated by a manufacturer of the UE, the correspondence is determined by the UE based on first capability information obtained from the UCMF entity. The first capability information is capability information for the manufacturer of the UE.

In an embodiment, for a UE capability identifier allocated by a Public Land Mobile Network (PLMN), the correspondence is determined by the UE based on second capability information obtained from the UCMF entity. The second capability information is capability information for the PLMN.

In an embodiment, the second transmitting unit 601 is further configured to transmit a UE capability or the UE capability identifier to the core network element.

In an embodiment, the UE further includes a third receiving unit 602, configured to receive the UE capability identifier transmitted by the core network element. The UE capability identifier is allocated by a UE Capability Management Function (UCMF) entity.

In an embodiment, the capability set of the UE has a correspondence with the UE capability identifier and the network mode of the UE.

In an embodiment, the capability set of the UE, the UE capability identifier, and the network mode of the UE are in a one-to-one correspondence.

Herein, for different network modes, different capability sets of the UE correspond to different UE capability identifiers.

In an embodiment, the network mode includes at least one of: a Narrow Band Internet of Things (NB-IoT) mode, a Wide Band-Evolved Universal Mobile Telecommunication System (UMTS) Terrestrial Radio Access Network (WB-EUTRAN) mode, or a Radio Access Technology (RAT) network mode other than NB-IoT and WB-EUTRAN. The core network element includes an Access and Mobility Management Function (AMF) entity or a Mobility Management Entity (MME).

An embodiment of the present disclosure further provides a core network element. The core network element includes a processor and a memory for storing a computer program capable of being run on the processor. The processor is configured to, when running the computer program, perform operations of the method for determining a capability of a UE which performed by the core network element.

An embodiment of the present disclosure further provides a UE. The UE includes a processor and a memory for storing a computer program capable of being run on the processor. The processor is configured to, when running the computer program, perform operations of the method for determining a capability of a UE which is performed by the UE.

Figure 7:
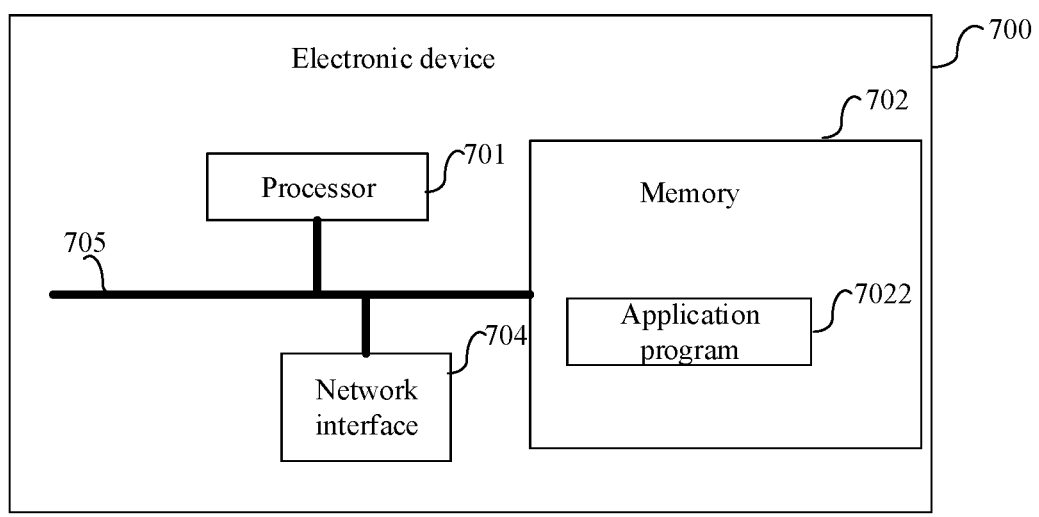
FIG. 7 is a diagram of a hardware structure of an electronic device according to an embodiment of the present disclosure.

FIG. 7 is a diagram of a hardware structure of an electronic device (e.g., UE and core network element) in an embodiment of present disclosure. An electronic device 700 includes at least one processor 701, a memory 702, and at least one network interface 704. The various components in the electronic device 700 are coupled together by a bus system 705. It will be understood that the bus system 705 is used to implement connection communication between these components. The bus system 705 includes a power bus, a control bus, and a status signal bus in addition to a data bus. However, for purposes of clarity, various buses are labeled as a bus system 705.

It will be understood that the memory 702 may be a volatile memory or a non-volatile memory, or may include both a volatile memory and a non-volatile memory. Among them, the non-volatile memory may be a read-only memory (ROM), a programmable ROM (PROM), an erasable PROM (EPROM), an electrically EPROM (EEPROM), a ferromagnetic random access memory (FRAM), a flash memory, a magnetic surface memory, a CD or a compact disc read-only memory (CD-ROM). The magnetic surface memory may be a disk memory or a tape memory. The volatile memory may be a random access memory (RAM), which is used as an external cache. By way of exemplary but not restrictive description, many forms of RAMs are available, such as a static RAM (SRAM), a synchronous static RAM (SSRAM), a dynamic RAM (DRAM), a synchronous DRAM (SDRAM), a double data rate SDRAM (DDRSDRAM), an enhanced SDRAM (ESDRAM), a synchlink DRAM (SLDRAM)) and a direct rambus RAM (DRRAM). It should be noted that the memory 702 described herein are intended to include, but are not limited to, these and any other suitable types of memories. It should be understood that the foregoing memory is exemplary but not restrictive.

The memory 702 in the embodiment of the present disclosure is used to store various types of data to support operations of the electronic device 700. Examples of such data include any computer program, such as an application program 7022, which is operated on the electronic device 700. The programs implementing the method of the embodiments of the present disclosure may be included in the application program 7022.

The methods disclosed in the above embodiment of the present disclosure may be applied to or implemented by the processor 701. The processor 701 may be an integrated circuit chip having signal processing capabilities. During the implementation, the operations of the above methods may be accomplished by hardware integrated logic circuits in processor 701 or instructions in the form of software. The processor 701 described above may be a general purpose processor, a digital signal processor (DSP), or other programmable logic devices, discrete gates or transistor logic devices, discrete hardware components, or the like. The processor 701 may implement or perform the methods, operations, and logical block diagrams disclosed in the embodiments of the present disclosure. The general purpose processor may be a microprocessor or any conventional processor or the like. The operations of the methods disclosed in connection with the embodiments of the present disclosure may be directly performed by a hardware decoding processor or performed by a combination of hardware and software modules in the decoding processor. The software module may be located in a storage medium. The storage medium is located in the memory 702. The processor 701 reads information in the memory 702 and completes the operations of the foregoing methods in combination with hardware in the processor 701.

In an exemplary embodiment, the electronic device 700 may be implemented by one or more application specific integrated circuits (ASICs), digital signal processors (DSPs), programmable logic devices (PLDs), complex programmable logic devices (CPLDs), field programmable gate array (FPGAs), general purpose processors, controllers, microcontroller units (MCUs), microprocessor units (MPUs), or other electronic components for performing the foregoing methods.

An embodiment of the present application further provides a storage medium for storing a computer program.

In an embodiment, the storage medium may be applied to the UE or the core network element in the embodiments of the present application, and the computer program causes a computer to execute the corresponding operations of the methods in the embodiments of the present disclosure. For brevity, details are not described herein.

The present disclosure is described with reference to flowcharts and/or block diagrams of a method, a device (system), and a computer program product according to the embodiments of the present disclosure. It will be understood that each flow and/or block in the flowchart and/or block diagram and the combination of the flow and/or block in the flowchart and/or block diagram may be implemented by computer program instructions. These computer program instructions may be provided to a processor of a general purpose computer, a dedicated computer, an embedded processor, or other programmable data processing device to generate a machine, such that instructions executed by the processor of the computer or other programmable data processing device generate apparatuses for implementing the functions specified in one or more flows in the flowchart and/or one or more blocks in the block diagram.

The computer program instructions may also be stored in a computer-readable memory capable of directing a computer or other programmable data processing device to operate in a particular manner, such that the instructions stored in the computer-readable memory produce manufactured articles including an instruction apparatus. The instruction apparatus implements the functions specified in one or more flows in the flowchart and/or one or more blocks in the block diagram.

The computer program instructions may also be loaded onto a computer or other programmable data processing device such that a series of operations are performed on the computer or other programmable device to generate a computer-implemented processing, thus the instructions performed on the computer or other programmable device provide operations for implementing the functions specified in one or more flows in the flowchart and/or one or more blocks in the block diagram.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

It should be understood that the term "and/or" herein describes an association relationship of associated objects, which means that there may be three relationships. For example "A and/or B" may have three meanings: A exists alone, A and B exist at the same time and B exists alone. In addition, the character "/" herein generally indicates that the associated objects before and after the character "/" are in an "or" relationship.

The foregoing description is merely preferred embodiments of the present disclosure and is not intended to limit the scope of protection of the present disclosure. Any modifications, equivalent substitutions and modifications made within the spirit and principles of the present disclosure shall be included within the scope of protection of the present disclosure. Therefore, the scope of protection of the disclosure shall be subject to the scope of protection of the claims.

The invention claimed is:

1. A method for determining a capability of a User Equipment (UE), comprising:
    transmitting, by the UE, a network mode to a core network element, wherein the network mode is used by the core network element to determine a UE capability identifier corresponding to the network mode, and the network mode comprises at least one of: a Narrow Band Internet of Things (NB-IoT) mode, a Wide Band-Evolved Universal Mobile Telecommunication System (UMTS) Terrestrial Radio Access Network (WB-EUTRAN) mode, or a Radio Access Technology (RAT) network mode other than NB-IoT and WB-EUTRAN, wherein for each network mode among different network modes, a respective UE capability identifier has a correspondence with a corresponding capability set of the UE, the capability set of the UE has a correspondence with the UE capability identifier and the network mode of the UE, and the capability set of the UE, the UE capability identifier, and the network mode of the UE are in a one-to-one correspondence, and
    receiving, by the UE, the UE capability identifier transmitted by the core network element, wherein the UE capability identifier is allocated by a UE Capability Management Function (UCMF) entity.

2. The method of claim 1, wherein for a UE capability identifier allocated by a manufacturer of the UE, the correspondence is determined by the UE based on first capability information obtained from the UE Capability Management Function (UCMF) entity; and
    the first capability information is capability information for the manufacturer of the UE,
    or,
    wherein for a UE capability identifier allocated by a Public Land Mobile Network (PLMN), the correspondence is determined by the UE based on second capability information obtained from the UE Capability Management Function (UCMF) entity; and
    the second capability information is capability information for the PLMN.

3. The method of claim 1, further comprising:
    transmitting, by the UE when the UE camps on a current cell, or moves to a registration area or tracking area, the UE initiates a registration request or a registration update, or an attach request or a tracking area updates, the UE capability identifier to the core network element, wherein the UE capability identifier matches the network mode of the current cell, the registration area, or the tracking area.

4. The method of claim 1, wherein the method further comprises:
    transmitting, by the UE when no respective UE capability identifier for the capability set of the UE exists, the capability set of the UE and the network mode to the core network element, for the core network element to transmit the capability set of the UE and the network mode to the UCMF entity and receive the UE capability identifier allocated by the UCMF entity for the capability set of the UE.

5. A User Equipment (UE), comprising:
a processor;
a network interface; and
a memory for storing computer program instructions that, when executed by the processor, cause the processor to:
control the network interface to transmit a network mode to a core network element, wherein the network mode is used by the core network element to determine a UE capability identifier corresponding to the network mode, and the network mode comprises at least one of: a Narrow Band Internet of Things (NB-IoT) mode, a Wide Band-Evolved Universal Mobile Telecommunication System (UMTS) Terrestrial Radio Access Network (WB-EUTRAN) mode, or a Radio Access Technology (RAT) network mode other than NB-IoT and WB-EUTRAN, wherein for each network mode among different network modes, a respective UE capability identifier has a correspondence with a corresponding capability set of the UE, the capability set of the UE has a correspondence with the UE capability identifier and the network mode of the UE, and the capability set of the UE, the UE capability identifier, and the network mode of the UE are in a one-to-one correspondence; and control the network interface to receive the UE capability identifier transmitted by the core network element, wherein the UE capability identifier is allocated by a UE Capability Management Function (UCMF) entity.

6. The UE of claim 5, for a UE capability identifier allocated by a manufacturer of the UE, the correspondence is determined by the UE based on first capability information obtained from the UCMF entity; and
the first capability information is capability information for the manufacturer of the UE,
or,
wherein for a UE capability identifier allocated by a Public Land Mobile Network (PLMN), the correspondence is determined by the UE based on second capability information obtained from the UCMF entity; and
the second capability information is capability information for the PLMN.

7. The UE of claim 5, wherein the processor is further configured to control, when the UE camps on a current cell, or moves to a registration area or tracking area, the UE initiates a registration request or a registration update, or an attach request or a tracking area updates, the network interface to transmit the UE capability identifier to the core network element, wherein the UE capability identifier matches the network mode of the current cell, the registration area, or the tracking area.

8. The UE of claim 5, wherein for different network modes, different capability sets of the UE correspond to different UE capability identifiers.

9. The UE of claim 5, wherein the core network element comprises:
an Access and Mobility Management Function (AMF) entity or a Mobility Management Entity (MME).

10. The UE of claim 5, wherein the processor is further configured to: when no respective UE capability identifier for the capability set of the UE exists, control the network interface to transmit the capability set of the UE and the network mode to the core network element, for the core network element to transmit the capability set of the UE and the network mode to the UCMF entity and receive the UE capability identifier allocated by the UCMF entity for the capability set of the UE.

11. The UE of claim 10, wherein the processor is further configured to control the network interface to store the one-to-one correspondence among the capability set of the UE, the UE capability identifier, and the network mode of the UE.

12. A core network element, comprising:
a processor;
a network interface; and
a memory for storing computer program instructions that, when executed by the processor, cause the processor to determine, according to a network mode in which a User Equipment (UE) camps, a UE capability identifier corresponding to the network mode; and control the network interface to transmit the UE capability identifier to an access network element and the UE,
wherein the network mode comprises at least one of: a Narrow Band Internet of Things (NB-IoT) mode, a Wide Band-Evolved Universal Mobile Telecommunication System (UMTS) Terrestrial Radio Access Network (WB-EUTRAN) mode, or a Radio Access Technology (RAT) network mode other than NB-IoT and WB-EUTRAN;
wherein for each network mode among different network modes, a respective UE capability identifier has a correspondence with a corresponding capability set of the UE, the capability set of the UE has a correspondence with the UE capability identifier and the network mode of the UE, and the capability set of the UE, the UE capability identifier, and the network mode of the UE are in a one-to-one correspondence, and
wherein the UE capability identifier is allocated by a UE Capability Management Function (UCMF) entity.

13. The core network element of claim 12, wherein the processor is further configured to determine the network mode in which the UE camps, according to at least one of:
an identity of a cell on which the UE camps;
a registration area of the UE;
a location area of the UE;
a tracking area of the UE; or,
the network mode that is indicated by the UE when the UE reports a capability or the capability identifier and that is suitable for the capability or the capability identifier.

14. The core network element of claim 12, wherein the processor is further configured to control the network interface to transmit an obtained capability set of the UE to the UCMF entity; and receive the UE capability identifier allocated by the UCMF entity for the capability set of the UE.

15. The core network element of claim 14, wherein the UE capability identifier is transmitted to the UE to enable the UE to store the one-to-one correspondence among the capability set of the UE, the UE capability identifier, and the network mode of the UE.

16. The core network element of claim 12, wherein the processor is further configured to control, when the UE camps on a current cell, or moves to a registration area or tracking area, the UE initiates a registration request or a registration update, or an attach request or a tracking area updates, the network interface to receive the UE capability identifier transmitted by the UE, wherein the UE capability identifier matches the network mode of the current cell, the registration area, or the tracking area.

17. The core network element of claim 12, wherein the processor is further configured to control, when no respective UE capability identifier for the capability set of the UE exists, the network interface to receive the capability set of the UE and the network mode transmitted by the UE; transmit the capability set of the UE and the network mode to the UCMF entity; receive the UE capability identifier allocated by the UCMF entity for the capability set of the UE.

* * * * *